UNITED STATES PATENT OFFICE.

ROBERT K. WRIGHT, JR., OF PHILADELPHIA, PENNSYLVANIA.

DISTILLATION.

1,316,214.  Specification of Letters Patent.  Patented Sept. 16, 1919.

Application filed March 30, 1916. Serial No. 87,666.

*To all whom it may concern:*

Be it known that I, ROBERT K. WRIGHT, Jr., a citizen of the United States, residing at Philadelphia, in the county of Philadelphia and State of Pennsylvania, have invented certain new and useful Improvements in Distillation, of which the following is a specification.

The principal objects of the present invention are, first, to produce fractional distillates ready for use without refining and of permanent or unchanging color and each of which is of uniform boiling point, and second, to do this by means of such mechanical additions and changes as can be readily and inexpensively made to and in existing stills, and by a process which does not require an undue time for its completion and which avoids the formation of free carbon and properly grades the fractions.

The invention will be claimed at the end hereof but will be first described in connection with the accompanying drawings forming part hereof and in which—

Figure 1:
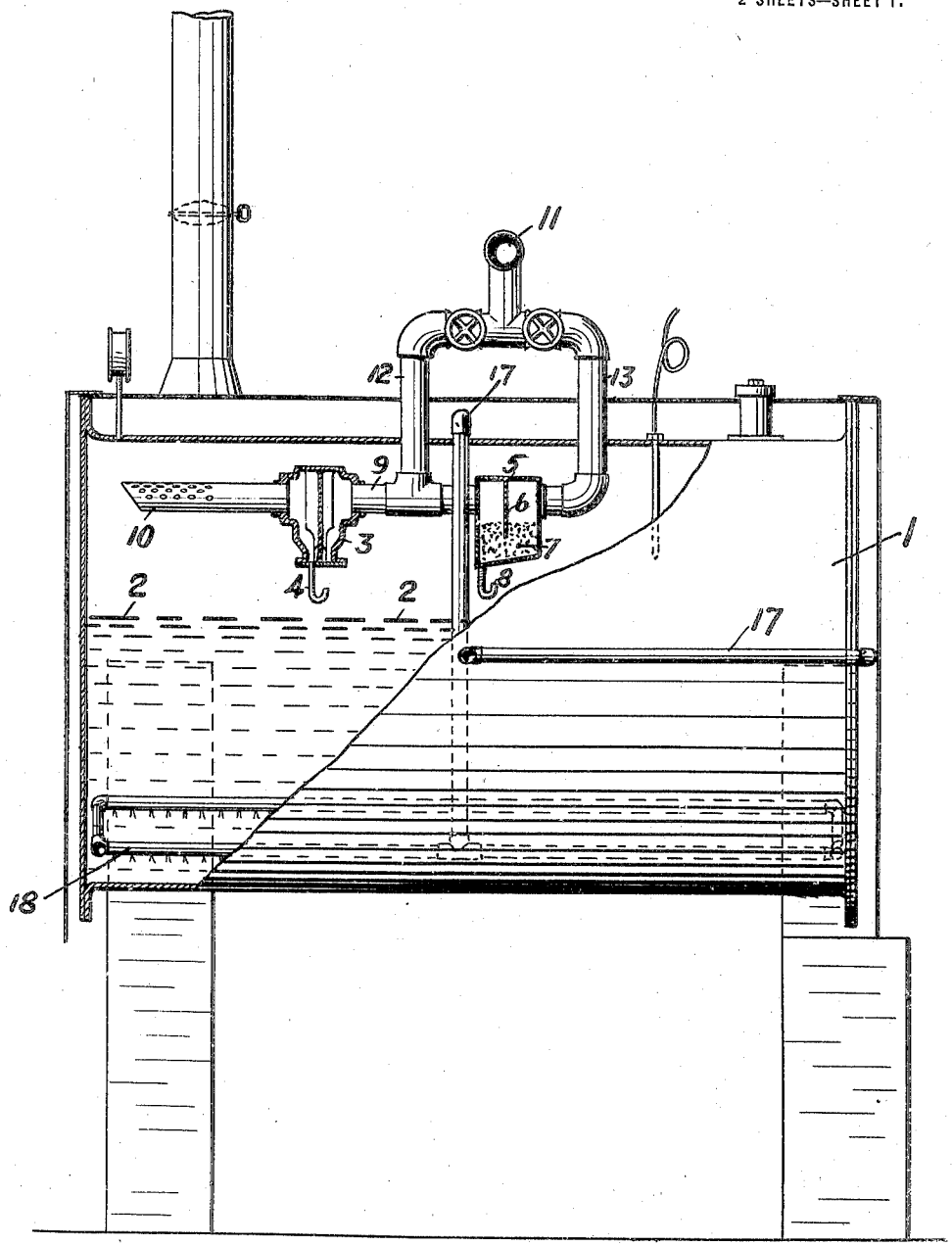
Figure 2:
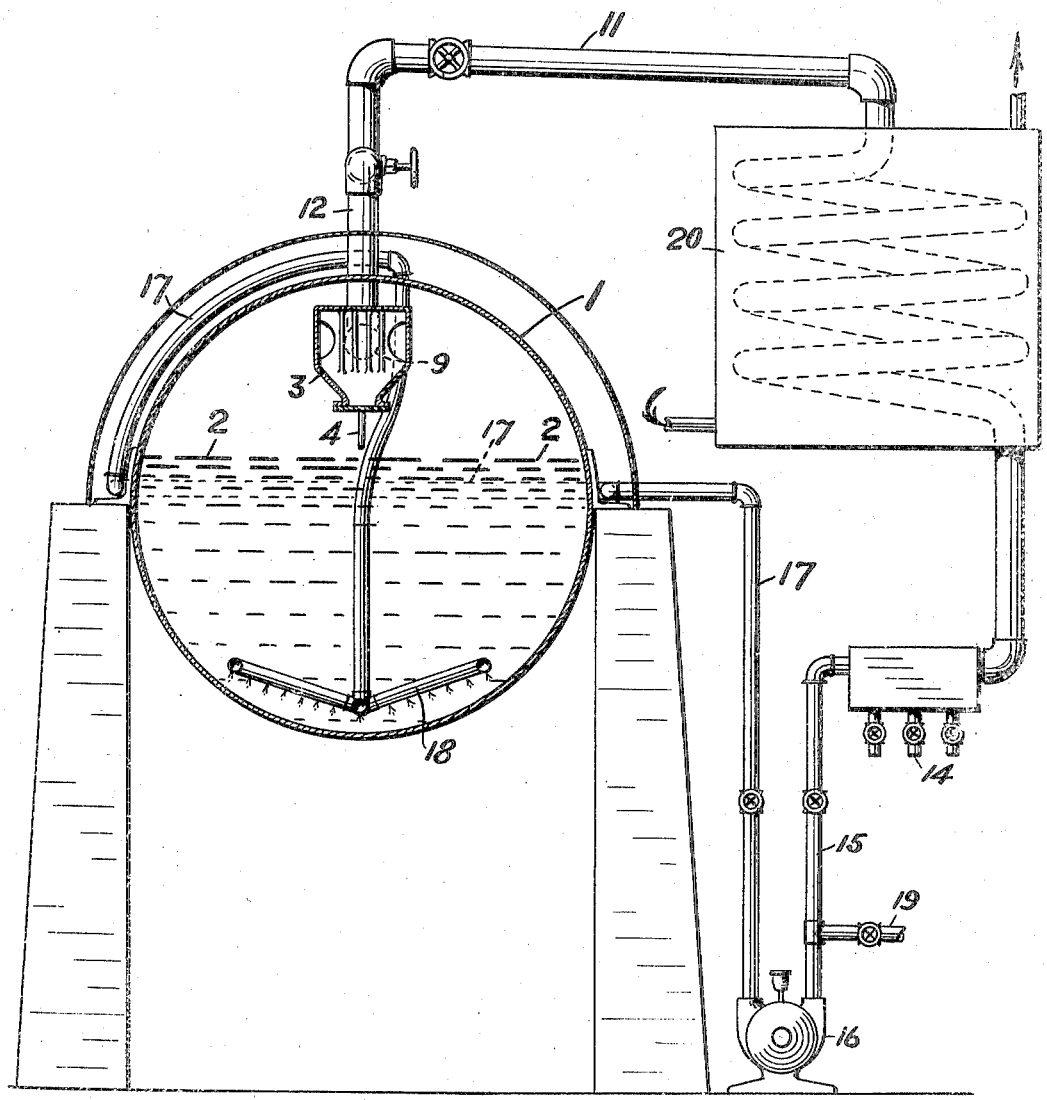

Figure 1, is a side view, partly in section, of apparatus embodying features of the invention, and Fig. 2, is an end view, partly in section, of the same.

Within the still 1, and in the vapor space, or space above the liquid level 2—2, there is arranged separating apparatus through which a mixture of distillate-vapor and gas or vapor introduced into the still is passed. This apparatus serves to remove from the mixture entrained liquid fractions of higher boiling point while it is at substantally the temperature of the vapor space of the still, and to return them to the still. This separating apparatus may assume various forms. For example it may be a liquid baffle separator, or a liquid comminuting separator, or a centrifugal liquid separator, or a combination of these or any of them. As shown in the drawings it consists of a liquid separator 3, having a liquid outlet 4, suitably sealed against the entrance of vapor or gas, and of a separator 5, having a baffle plate 6, and suitable comminuted burnt clay or other material 7, and having a liquid outlet 8, suitably sealed against the entrance of vapor or gas. The separators are shown as interposed in the pipe 9, open at its end 10, to form an inlet for the mixture of distillate-vapor and gas or vapor introduced through the contents of the still. 11, is a valved pipe leading to the condenser 20, and provided with branches 12 and 13, each provided with valves and communicating with the pipe 9, on opposite sides of the separator 5, so that both of the separators 3 and 5, can be used, or the separator 5, can be by-passed by manipulating the valves of the branches 12 and 13. The distillates from the condenser may be drawn off at the connections 14. Gas or vapor that is introduced into and circulated through the system passes by the pipe 15, pump 16, and pipe 17, which passes in the jacket of the still to one end, thence across that end back to the middle and up on the opposite side of the still through the top thereof, to a distributing device 18, in the bottom of the still. 19, is an inlet that may be employed for the introduction of such additional supplies of gas as may be necessary.

In the practice of the invention the gas or vapor employed should not be steam but bay be any suitable gas examples of which are ordinarily city gas and gas such as is made in the ordinary fractional distillation of petroleum. This gas is pre-heated and upon entering the externally heated still, rises through the heated contents of the still and reaches the vapor space thereof along with such vapor distillates as come off with it. The mixture of introduced gas or vapor and distilled vapor passes through the separating apparatus which cleans it and removes entrained higher boiling point fractions while the mixture is at substantially the temperature of the vapor space of the still. The various fractions are distilled without unduly heating the contents of the still, thus avoiding the formation of free carbon and consequently benefiting not only the distillates but also the residuum. Inasmuch as the intrained higher boiling point fractions are removed from the mixture of distillate vapor and introduced gas or vapor, each fractional distillate is of substantially uniform boiling point and retains its color. Moreover each of the distillates is ready for use without further treatment or refining.

It will be obvious to those skilled in the art that modifications may be made in details without departing from the spirit of the invention which is not limited as to such matters or otherwise than as the prior state of the art and the appended claim may require.

What I claim is:

Distilling apparatus comprising the combination of a still, baffling and filtering apparatus arranged in the vapor space of and within the still, connections for passing gas or vapor through the contents of the still and for passing a mixture of such gas or vapor and distillate-vapor through said apparatus and thence from the still, and means for returning separated liquid to the still, substantially as described.

ROBERT K. WRIGHT, Jr.